United States Patent [19]

Otten et al.

[11] 4,046,501

[45] Sept. 6, 1977

[54] PROCESS FOR THE DYEING AND PRINTING OF SYNTHETIC POLYAMIDES

[75] Inventors: Joachim Otten, Offenbach am Main; Helmut Troster, Konigstein, Taunus, both of Germany

[73] Assignee: Hoechst Aktiengesellschaft, Frankfurt am Main, Germany

[21] Appl. No.: 618,221

[22] Filed: Sept. 30, 1975

[30] Foreign Application Priority Data

Oct. 2, 1974 Germany .............................. 2446989

[51] Int. Cl.² ............................................. D06P 1/382
[52] U.S. Cl. ........................................ 8/1 E; 8/1 N; 8/1 P; 8/1 Q; 8/37; 8/178 R; 260/281 Z
[58] Field of Search .................. 8/1 E, 1 P, 1 Q, 1 N, 8/178 R, 37; 260/281 Z

[56] References Cited

U.S. PATENT DOCUMENTS 3,741,971  6/1973  Fuchs .............................. 260/281 Z
3,749,727  7/1973  Fuchs .............................. 260/281 Z

OTHER PUBLICATIONS

German Offenlegungsschaft 2,150,879, Apr. 26, 1973, Farbwerke, 14 pages.

Primary Examiner—Donald Levy
Attorney, Agent, or Firm—Curtis, Morris & Safford

[57] ABSTRACT

It has been found that dyestuffs of the formula

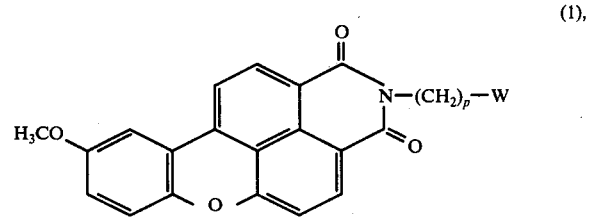

(1), in which p stands for an integer of from 1 to 6, and W represents, as a water-solubilizing group, the sulfo group, the sulfato group (—OSO₃H), the thiosulfato group (—S—SO₃H), the carboxyl group, the phosphato group (—OPO₃H₂), the phosphonic acid group (—PO(OH)₂) or the phosphonic acid-semi-ester group of the formula —PO(OR)OH, wherein R represents an alkyl radical of from 1 to 5 carbon atoms, preferably the methyl or ethyl radical, are very suitable in dyeing and printing processes of synthetic polyamide fiber materials and yield brilliant and very fast dyeings and prints on these materials, especially even dyeings of textured polyamide fibers which have differences in stretching.

4 Claims, No Drawings

PROCESS FOR THE DYEING AND PRINTING OF SYNTHETIC POLYAMIDES

The present invention relates to a process for the dyeing and printing of fiber materials of synthetic polyamides while using 10-methoxy-benzoxanthene-3,4-dicarboxylic acid-imide dyestuffs of the general formula (1)

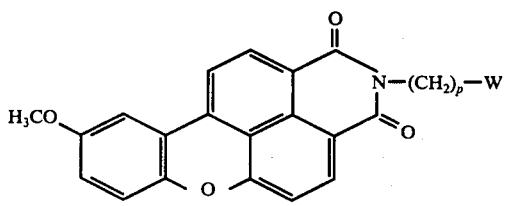

(1), in which p stands for an integer of from 1 to 6, and W represents, as a water-solubilizing group, the sulfo group, the sulfato group (—OSO$_3$H), the thiosulfato group (—S—SO$_3$H), the carboxyl group, the phosphato group (—OPO$_3$H$_2$), the phosphonic acid group (—PO(OH)$_2$) or the phosphonic acid-semi-ester group of the formula —PO(OR)OH, wherein R represents an alkyl radical of from 1 to 5 carbon atoms, preferably the methyl or ethyl radical.

It has been found that the dyestuffs of the above-mentioned formula (1) are excellently suitable for the dyeing and printing of textile materials on the basis of synthetic polyamides, such as for example, polyamide-6, polyamide-6,6 and polyamide 11.

The dyeings and prints obtained with the said dyestuffs are marked by a high brilliancy and very good fastness properties with regard to wearing and processing, for example, a good fastness to light, to washing at 30° to 100° C, such as 60° or 95° C, to acids, to water, to rubbing, to ironing, to alkali metals, and to acid and alkaline perspiration. Besides, there are to be mentioned the very good build-up, the extremely high color intensity and the very good affinity of these dyestuffs of the formula (1) to the above-mentioned fiber materials, and they dye materials of textured polyamide fibers showing differences in stretching generally in a regular manner.

Besides, the dyestuffs of the formula (1) yield - in admixture with suitable blue dyestuff types — green dyeings of a high brilliancy and of a fastness to light and to wetting as for example mentioned above, which have not been known before of mixtures of this kind.

The dyeings are carried out in known manner, while using slightly alkaline, neutral or acid, preferably slightly acid dye baths and printing pastes in a pH range of from 8 to 1, preferably from 8 to 3, especially 7 to 3.

The preparation of dyeings according to the invention in conformance with the exhaustion dyeing process in preferably effected in a way that the process is started at low temperatures and in a neutral or slightly alkaline bath. During the dyeing process, the temperature is increased and the pH value is reduced by adding organic and/or inorganic acids, such as acetic acid, formic acid or sulfuric acid, and/or acid salts, for example ammonium sulfate, so that the dyestuffs are absorbed and fixed at a temperature in the range of from 70 to 130° C and at a pH value of from 4 to 6. The dyeing time is generally in the range of from 30 to 90 minutes, preferably about 60 minutes. The dyestuffs are used in an amount of from 0.1 to 3%, preferably from 0.2 to 1%, calculated on the weight of the material to be dyed.

The dyeing and printing by means of padding liquors and/or printing pastes is carried out according to the usual and known processes. The printing pastes can be applied onto the polyamide material according to various common processes, for example, the roller printing, the block printing, and the screen printing processes, or by spraying. After the printing the material is dried, and the dyestuffs are fixed on the fiber by a treatment with hot air at a temperature in the range of from 150° to 230° C, preferably from 180° to 215° C, during 0.5 to 5 minutes, or by steaming with superheated steam of an increased tension, at a temperature of from 120° to 180° C. The fixation may also be effected by means of saturated steam of a temperature of from 100° to 103° C during 10 to 30 minutes.

If padding liquors are used, the dyestuff is fixed on the material treated after padding and squeezing off the material and, optionally, after an intermediate drying under the same conditions as have been specified for the printing.

In order to adjust the pH value in a range of from 7 to 3, the above-mentioned acids and/or acid salts are added to the padding liquors and printing pastes containing a dyestuff of the formula (1). As dyeing and printing auxiliaries, use may be made of the common auxiliaries having affinity to the fiber and to the dyestuff.

The dyestuffs of the formula (1) used according to the invention for the dyeing and printing of synthetic polyamide fiber materials can be prepared by reacting 10-methoxybenzoxanthene-3,4-dicarboxylic acid of formula (2) or the anhydride thereof of formula (3)

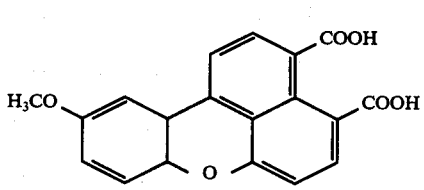

(2)

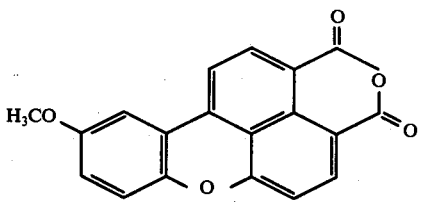

(3)

with an amine of the general formula (4)

 (4), wherein p and W are defined as above, with the formation of imide.

Besides, the sulfuric acid and phosphoric acid ester dyestuffs of the general formula (1) can be prepared by converting the 10-methoxybenzoxanthene-3,4-dicarboxylic acid imide of the general formula (5)

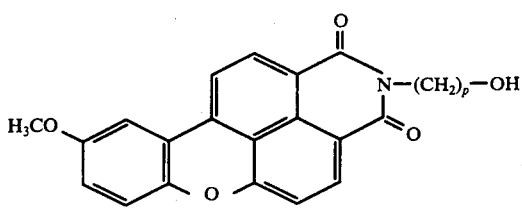

(5)

into the corresponding esters, by treating the said substance for example with sulfuric acid at a temperature of 10° to 40° C, preferably 20° to 30° C, or with polyphosphoric acid, respectively.

The following Examples serve to illustrate the invention. The amounts indicated in parts are parts by weight.

EXAMPLE 1

2 Parts of a levelling agent on the basis of polyoxethylated stearylamine and 0.5 part of a levelling agent on the basis of a tertiary condensation product of cyanuric chloride with aniline-3-sulfonic acid, 2 parts of ammonium acetate and 1 part of acetic acid of 60% strength were introduced into 3000 parts of water. In this bath, 100 parts of a polyamide-6,6-warp knitted material were subjected to a preliminary treatment for 20 minutes at 30° C. Subsequently, 0.5 part of the dyestuff dissolved in water having the formula

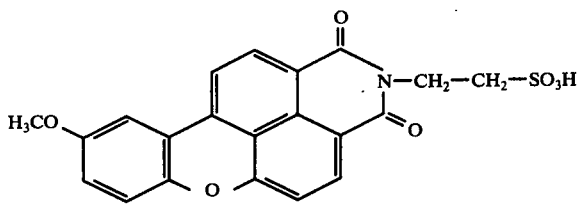

was added in the form of the sodium salt. The dye bath was heated to 98° C within 60 to 90 minutes and was maintained at this temperature for 60 minutes. Subsequently the material was rinsed and dried as usual.

The greenish yellow dyeing obtained was marked by a high brilliancy and very good fastness properties with regard to wearing, to mention in particular the fastness to light, to perspiration and to washing.

EXAMPLE 2

A polyamide-6 woven fabric (perlon) was padded on a dyeing pad with a padding liquor containing per liter of aqueous solution 30 g of the dyestuff mentioned in Example 1, 45 g of polyethylene-glycol-ether having an average molar weight of 400, 45 g of ethylene-glycol and 1 g of acetic acid of 60% strength at a bath temperature of 50° C, and was then squeezed off to a liquor pick-up of 75% by weight. Subsequently the polyamide material was subjected to an intermediate drying (up to a residual moisture of from 8 to 10% by weight) and was then heat-set on the stenter frame by hot air for 60 seconds at 190° C. Subsequently the material was washed and rinsed as usual. The greenish yellow dyeing obtained was marked by a high brilliancy and by good fastness properties with regard to wearing.

EXAMPLE 3

A polyamide-6,6 fabric was treated with the dyestuff solution according to Example 2, and was steamed, after the padding, for 2 minutes at 120° C. Subsequently the material was washed and dried as usual.

A highly brilliant greenish yellow dyeing was obtained which had very good fastness properties.

EXAMPLE 4

25 Parts of the dyestuff specified in Example 1 were pasted up by means of 30 parts of dibutylglycol. Subsequently, 250 parts of boiling water, 500 parts of a thickening agent on the basis of crystal gum, 30 parts of an aqueous solution of nitrobenzene-3-sulfonic acid of 33% strength, 20 parts of ammonium sulfate, 50 parts of urea, and 95 parts of water were added, while stirring. After this mixture had been printed onto the polyamide-6,6 knitted material, it was dried and steamed for 20 minutes at 100° C.

The fixed prints were rinsed with cold water and were washed as usual. Greenish yellow prints of a high brilliancy were obtained which had very good fastness properties with regard to wearing.

EXAMPLE 5

The polyamide-6,6 fabric printed with the dyestuff paste according to Example 4 was dried after the printing and was then treated with hot air for 60 seconds at a temperature of from 210° to 215° C, for the fixation of the dyestuff. Subsequently the material was washed and dried as usual.

Greenish yellow prints of a high brilliancy were obtained, which had good fastness properties with regard to wearing.

In admixture with suitable blue dyestuff types, the dyestuff specified in Example 1 yields from the bath as well as by printing on synthetic polyamide highly brilliant green shades having a very good fastness to light and to wetting.

EXAMPLE 6

At a temperature 40° C, 100 parts of polyamide-6 material were placed into a dye bath consisting of 4,000 parts of water, 2 parts of a levelling agent on the basis of polyoxethylated stearylamine, 2 parts of a levelling agent on the basis of a tertiary condensation product of cyanuric chloride with aniline-3-sulfonic acid and 0.5 part of a dyestuff of the formula

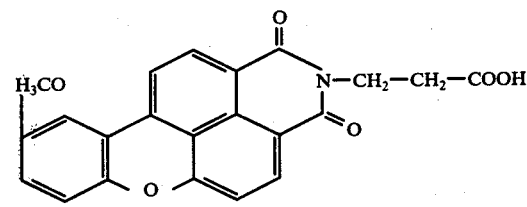

in the form of the sodium salt. In the course of 60 minutes, the dye bath was heated to boiling temperature, and this temperature was maintained for 1 hour. Subsequently 2 parts of glacial acetic acid were added, and the mixture was continued to be heated for 30 minutes at boiling temperature. Subsequently the material was rinsed at first with hot water, and then with cold water and was dried. Greenish yellow dyeings with a good brilliancy were obtained, which showed good fastness properties with regard to wearing.

EXAMPLES 7 to 11

In an analogous manner, according to the methods described in the above-mentioned Examples, polyamide fiber materials could be dyed with the dyestuffs corresponding to the general formula (1) which have been specified in the Table given below. By means of these dyestuff, highly brilliant dyeings and prints of a high color intensity having a greenish yellow color shade were also obtained, which had a good fastness to light and to wetness.

| Example | Formula member p | Formula member W |
| --- | --- | --- |
| 7 | 2 | —S—SO$_3$H |
| 8 | 3 | —O—SO$_3$H |
| 9 | 2 | —PO(OH)$_2$ |
| 10 | 2 | —PO(OC$_2$H$_5$)OH |
| 11 | 3 | —O—PO(OH)$_2$ |

We claim:

1. A process for the dyeing and printing of a fiber material on the basis of synthetic polyamides, which comprises using a dyestuff of the formula

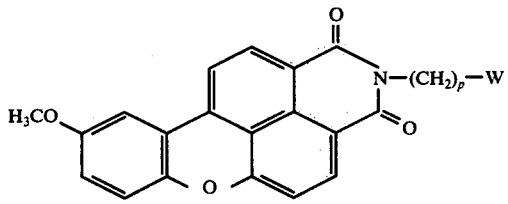

wherein $p$ is 1, 2, 3, 4, 5 or 6, W is sulfo, sulfato, thiosulfato, carboxy, phosphato, PO(OH)$_2$ or —PO(OR)(OH), wherein R is alkyl of 1 to 4 carbon atoms.

2. A process as claimed in claim 1, which comprises using a dyestuff of said formula, in which $p$ is 2.

3. A process as claimed in claim 1, which comprises using a dyestuff of said formula in which W is sulfo.

4. A process as claimed in claim 1, which comprises using a dyestuff of said formula, in which $p$ is 2 and W is sulfo.

* * * * *